US009882791B2

(12) United States Patent
Grotendorst et al.

(10) Patent No.: US 9,882,791 B2
(45) Date of Patent: Jan. 30, 2018

(54) REDUCING RECEIVED DATA IN A V2X NETWORK BASED ON RECEIVED SIGNAL STRENGTH

(71) Applicant: Continental Teves AG & Co. oHG, Frankfurt (DE)

(72) Inventors: Thomas Grotendorst, Eschborn (DE); Marc Menzel, Weimar (DE); Richard Scherping, Leiderbach am Taunus (DE); Ulrich Stählin, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 36 days.

(21) Appl. No.: 14/911,801

(22) PCT Filed: Aug. 22, 2014

(86) PCT No.: PCT/EP2014/067938
§ 371 (c)(1),
(2) Date: Feb. 12, 2016

(87) PCT Pub. No.: WO2015/025046
PCT Pub. Date: Feb. 26, 2015

(65) Prior Publication Data
US 2016/0197797 A1    Jul. 7, 2016

(30) Foreign Application Priority Data

Aug. 22, 2013 (DE) .................. 10 2013 216 624

(51) Int. Cl.
*H04J 3/22* (2006.01)
*H04L 12/26* (2006.01)
(Continued)

(52) U.S. Cl.
CPC ........... *H04L 43/028* (2013.01); *G08G 1/093* (2013.01); *G08G 1/162* (2013.01); *G08G 1/163* (2013.01);
(Continued)

(58) Field of Classification Search
CPC .................................................. H04L 43/028
(Continued)

(56) References Cited

U.S. PATENT DOCUMENTS 8,149,715 B1   4/2012   Goel
9,014,921 B2   4/2015   Bretzigheimer
(Continued)

FOREIGN PATENT DOCUMENTS

CN     1756164 A       4/2006
DE     102004030994    1/2006
(Continued)

OTHER PUBLICATIONS

Japanese Office Action for Japanese Application No. 2016-535495, dated Jan. 30, 2017, including English translation, 8 pages.
(Continued)

*Primary Examiner* — Mohammad Anwar
*Assistant Examiner* — Angel Brockman
(74) *Attorney, Agent, or Firm* — RatnerPrestia

(57) ABSTRACT

A method for filtering a transmission signal transmitted in a vehicular ad hoc network, the signal carrying at least position data of participants in data packets. The method includes the following steps: receiving the transmission signal; filtering the data packets from the transmission signal based on a receive filter having a predetermined receive filter specification for demodulating the data packets from the transmission signal, and an additional predetermined
(Continued)

condition; and distributing the filtered data packets to a data processing unit superordinate to the receive filter.

10 Claims, 10 Drawing Sheets

(51) Int. Cl.
    *G08G 1/09* (2006.01)
    *G08G 1/16* (2006.01)
    *H04L 29/08* (2006.01)
    *H04W 84/18* (2009.01)
    *H04B 17/318* (2015.01)
    *H04L 12/807* (2013.01)
    *G08G 1/0967* (2006.01)

(52) U.S. Cl.
    CPC ........... *H04B 17/318* (2015.01); *H04L 47/27* (2013.01); *H04L 67/12* (2013.01); *H04L 67/2828* (2013.01); *H04W 84/18* (2013.01); *G08G 1/09675* (2013.01); *G08G 1/096791* (2013.01); *G08G 1/166* (2013.01)

(58) Field of Classification Search
    USPC ........................................................ 370/465
    See application file for complete search history.

(56) References Cited

U.S. PATENT DOCUMENTS

| | | | |
|---|---|---|---|
| 9,282,485 | B2 | 3/2016 | Mizuguchi et al. |
| 2004/0246922 | A1* | 12/2004 | Ruan ..................... H04W 48/20 370/331 |
| 2006/0067231 | A1 | 3/2006 | Ikoma et al. |
| 2007/0002866 | A1 | 1/2007 | Belstner et al. |
| 2008/0076461 | A1 | 3/2008 | Itaya |
| 2011/0170443 | A1 | 7/2011 | Murias |
| 2012/0220231 | A1 | 8/2012 | Stahlin |
| 2013/0083679 | A1 | 4/2013 | Krishnaswamy |

FOREIGN PATENT DOCUMENTS

| | | |
|---|---|---|
| DE | 102006029525 | 1/2007 |
| DE | 102011080789 | 2/2012 |
| EP | 2178064 | 4/2010 |
| JP | 2004206624 A | 7/2004 |
| JP | 2007013961 A | 1/2007 |
| JP | 2008085924 A | 4/2008 |
| WO | 2009158227 | 12/2009 |
| WO | 2010139526 | 12/2010 |
| WO | 2013008448 A1 | 1/2013 |

OTHER PUBLICATIONS

German Search Report for German Application No. 10 2014 216 776.0 dated Nov. 28, 2014, including partial translation.

International Search Report for International Application No. PCT/EP2014/067938 dated Feb. 4, 2015.

Wisitpongphan, N. et al., "Broadcast storm mitigation techniques in vehicular ad hoc networks," Dec. 1997, pp. 84-94, IEEE Wireless Communications.

Chinese Office Action for Chinese Application No. 201480046550.5, dated Aug. 9, 2017, including English translation, 13 pages.

* cited by examiner

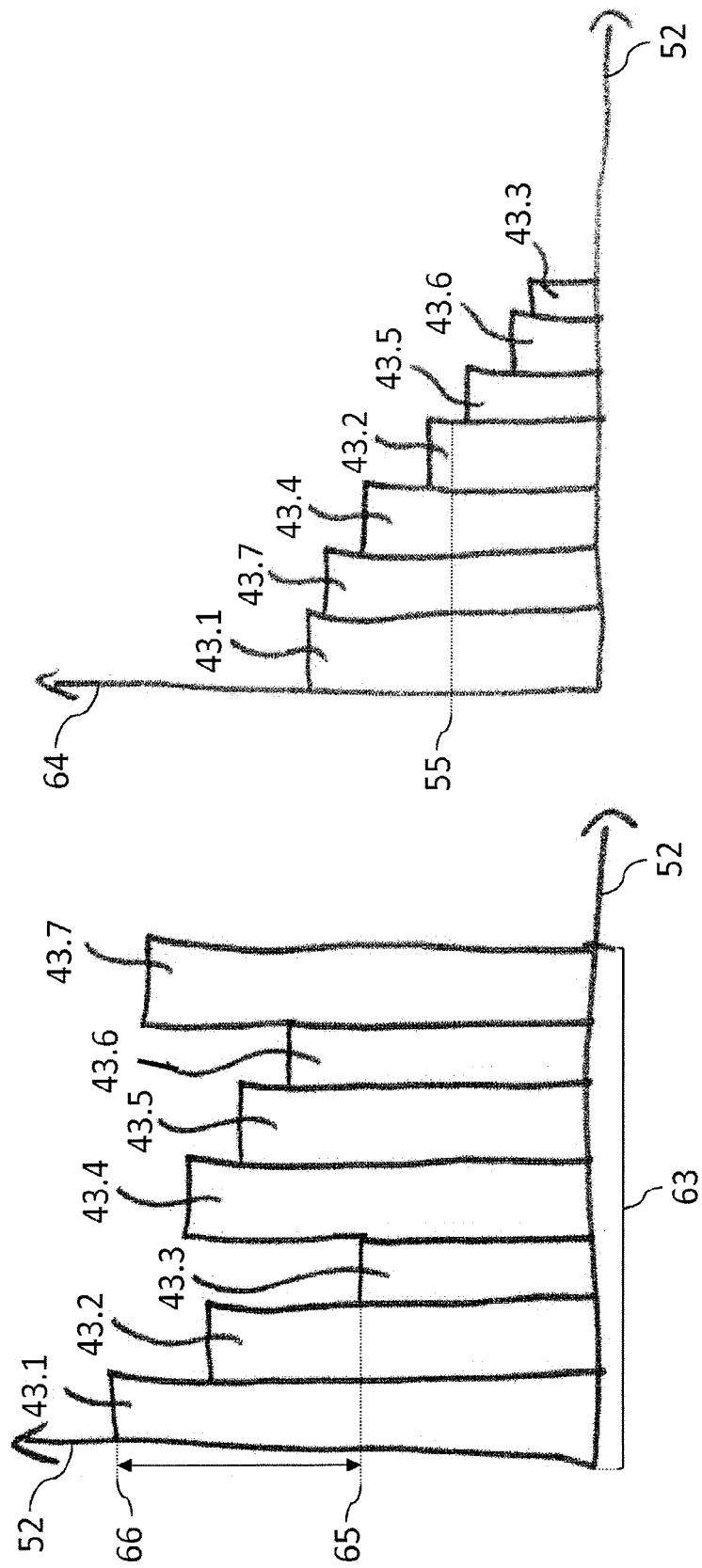

REDUCING RECEIVED DATA IN A V2X NETWORK BASED ON RECEIVED SIGNAL STRENGTH

CROSS REFERENCE TO RELATED APPLICATIONS

This application is the U.S. National Phase Application of PCT International Application No. PCT/EP2014/067938, filed Aug. 22, 2014, which claims priority to German Patent Application No. 10 2013 216 624.9, filed Aug. 22, 2013, the contents of such applications being incorporated by reference herein.

FIELD OF THE INVENTION

The invention relates to a method for filtering a transmission signal transmitted in a vehicular ad hoc network, which signal carries in data packets at least position data about participants in a vehicular ad hoc network, and also relates to a filter device for implementing the method and to a receiver containing the filter device.

BACKGROUND OF THE INVENTION

WO 2010/139 526 A1, which is incorporated by reference, discloses a mobile ad hoc network referred to as a car2X network, the nodes of which network are specific road users such as vehicles, or other objects in the road traffic such as traffic lights. The road users participating in the car2X network can be provided with information about road-traffic situations such as accidents, traffic jams, hazardous situations, etc. via these networks.

SUMMARY OF THE INVENTION

An aspect of the invention aims to improve the use of such mobile ad hoc networks.

In one aspect of the invention, a method for filtering a transmission signal transmitted in a vehicular ad hoc network, which signal carries in data packets at least position data about vehicles, comprises:
receiving the transmission signal;
filtering the data packets from the transmission signal on the basis of a receive filter that has a predetermined receive filter specification for demodulating the data packets from the transmission signal and an additional predetermined condition; and
outputting the filtered data packets to a data processing unit at a higher level than the receive filter.

The specified method is based on the consideration that in a vehicular ad hoc network, the volume of data, which must then be processed by the relevant receivers in the vehicles participating in the vehicular ad hoc network, can vary as claimed in the traffic situation. Broadly speaking, the data to be sent in the vehicular ad hoc network is initially allocated to data packets, which are then in turn modulated onto a transmission signal. A recipient of the sent data must accordingly first filter the data packets out of the transmission signal and then assemble the data packets into the sent data. Only then can the sent data be processed.

An amount of computing power commensurate with the volume of data that arises must then be provided for processing the sent data, and in the extreme case is based on the maximum possible channel load. The maximum possible channel load, however, is utilized only in particularly extreme situations, for instance situations in which there is a very high traffic density (traffic jam, etc.). In such situations, however, it would not be necessary to analyze all the data sent in the vehicular ad hoc network because only some of this sent data is relevant to the vehicle concerned.

In order to decide which of the sent data is, or is not, relevant, a correspondingly large amount of computing power would need to be used initially, however, to assemble the sent data from the transmission signal and the data packets contained therein. Since the sent data usually contains, apart from the position data, additional data such as timestamps, traffic-situation announcements or other messages, just the computing time for assembling from the sent data packets in the above-mentioned extreme case is extremely high without even having made any assessment of the sent data. Moreover, for the same volume, the sent data may require processing steps of different complexity as claimed in the type of data, which makes it even harder to determine the maximum computing load to be kept available. This can be observed, for example, with data, such as traffic jam messages, which is meant to be forwarded to vehicles that are not yet in direct communication range of an event to be communicated.

The specified filtering method deals with this by the idea of assessing the sent data not after the data packets are assembled into the sent data, but rather at an early stage prior to the assembly, with the assessment taking place at the transmission-signal level and/or at the data-packet level. For this purpose, a predetermined condition is introduced, on the basis of which it is possible to decide whether the data sent using the transmission signal and the data packets is deemed relevant or is discarded.

Such an approach is already known from object recognition using a camera system, on the basis of which, decisions critical to road safety must likewise sometimes be made. The amount of data from a camera used in object recognition is so high that the direct pixel data volume from the camera cannot be used immediately for all necessary object recognitions. The necessary information is thus collected and repeatedly consolidated from the pixel data volume in intermediate steps. Thus in a first intermediate step, for instance, certain object and scene information can be collected from the pixel data volume, for instance information such as whether the traffic lane is to the left and/or right of the vehicle. If an incorrect decision is made in an intermediate step, however, then this incorrect decision is reflected in all the subsequent intermediate steps, with the result that relevant objects or scenes may not be recognized as such. Over time, however, the best possible recognition of all relevant objects is guaranteed because a balance is always struck between computing time and recognition performance.

Knowing that the pixels from the camera, like the data packets in the vehicular ad hoc network, constitute a form of raw data for the processing system in the vehicle, the principle of object recognition using a camera system can also be applied to the transmission of information using the vehicular ad hoc network, with the relevant data being selected at the transmission-signal level and/or the data-packet level in the manner already explained. Although it can no longer be guaranteed thereby that all the important data packets are also assembled into the corresponding sent data, it can be assumed that relevant data packets, for instance from a breakdown on the road, are sent more frequently. Owing to the changing underlying conditions between two sent data packets containing the same sent data from the same sender, it can be assumed as a statistical average that the data packets pass through the filter defined by the predetermined condition early enough for the relevant vehicle to be able to react. Like the case in the above-mentioned object recognition using the camera system, it is hence proposed in the present invention to strike a balance between computing time and recognition performance. This is realized using the predetermined condition, which is advantageously varied over time in order to strike a balance between computing time and recognition performance.

In a development of the specified method, the predetermined condition comprises a minimum signal strength that the transmission signal must possess at the position of a specific data packet. This development is based on the consideration that transmission signals from more distant vehicles or other participants of the vehicular ad hoc network arrive at the receiver with a lower signal strength than transmission signals from participants located closer to the receiver. Since from the safety viewpoint, the vehicle must react to participants such as vehicles, traffic lights, etc. located in the immediate vicinity earlier than to participants lying further away, then selecting a minimum signal strength in the predetermined condition does not endanger road safety. It is possible then that messages such as traffic jam announcements are no longer forwarded in the vehicular ad hoc network, but initially this is only of lower relevance to road safety.

Although the predetermined condition and in particular the minimum signal strength can be selected as a constant value, it should preferably be dependent on a processing load of the receive filter and/or of the data processing unit. In other words, if the data processing unit assembling the sent data from the data packets and processing said data is being utilized at a certain percentage level, the radius at which data can be received from the vehicular ad hoc network could be reduced by raising the minimum signal strength, in order to take the percentage level back below a certain setpoint percentage level. The variable adjustment of the predetermined condition and in particular of the minimum signal strength ensures that in the long term, the processing load is reliably limited while making optimum use of all available computing resources. In addition, the variable adjustment of the predetermined condition and in particular of the minimum signal strength also guarantees that in situations in which there is a low channel load and hence processing load for the receive filter and/or the data processing device, an unnecessarily large amount of sent data is not filtered out.

In a particular development of the specified method, the dependency of the predetermined condition and in particular of the minimum signal strength on the processing load of the receive filter and/or of the data processing unit is regulated by a closed-loop control system. A specific percentage level for the processing load, for example, can form the basis for this control system as the setpoint value. By means of filtering as the final control element, the processing load can then be regulated as the actual value in the control system. Hence in this control system, the above-mentioned predetermined condition and in particular the minimum signal strength would be the manipulated value or at least incorporated therein. In other words, the predetermined condition and in particular the minimum signal strength are not adjusted directly but indirectly by means of the setpoint value. The setpoint value and the actual value are obviously not constrained to the example in this development but can be chosen as required as claimed in the application. In addition, the design of the controller should take into account delays such as time lags, for example, that are introduced into the system by the inertia of the communications hardware in receiving the transmission signal and demodulating the data packets.

In another development of the specified method, the minimum signal strength can depend on at least one normalized value for the transmission signal in a predetermined time window. Such normalized values are extremely well-known because they describe the effect of an alternating signal and hence of the transmission signal over time. Examples of normalized values are statistical quantities such as maximum, mean and minimum values of the signal level of the transmission signal. If the minimum signal strength is considered on the basis of a suitable normalized value, it is possible for other underlying conditions also to be taken into account in setting the minimum signal strength. Hence, for instance, the receive situation in a town center can be separated from a receive situation in the country if what is considered is, for example, the signal level of the transmission signal normalized with respect to the gap between maximum value and minimum value of the signal level of the transmission signal, with respect to the mean value of the signal level of the transmission signal or normalized with respect to the median of the signal level of the transmission signal.

In another development of the specified method, the minimum signal strength is chosen such that in the predetermined time window, a predetermined number of data packets transmitted by the transmission signal in the time window with the highest signal strengths are selected from the transmission signal. This ensures that the maximum possible number of data packets, as allowed by the computing power of the receive filter and/or of the data processing device, are always processed.

In another development of the specified method, the data packets are filtered first on the basis of the minimum signal strength, which is dependent on the processing load, and then on the basis of an additional minimum signal strength, which is dependent on the normalized value. In other words, the filtering can be performed in stages, where in the first stage, for example, the transmission signal can be filtered in order to filter out from the transmission signal already all the data packets that do not exceed a certain minimum signal strength. In this case, the predetermined condition and hence the minimum signal strength of this first filter stage should be designed such that more data packets arrive at the next filter stage than the computing power of the data processing unit is capable of handling. In the next filter stage, the data packets could then be fine-filtered on the basis of the additional minimum signal strength in a manner that is adapted to the computing power of the data processing unit. For this purpose, the additional minimum signal strength should be greater than the minimum signal strength.

In a particular development of the specified method, the value of the minimum signal strength should have an absolute maximum. This absolute maximum could equal, for example, the minimum receiver sensitivity, as specified in a standard defining the vehicular ad hoc network. An example of such a standard is the "Draft C2C-CC Basic System Standards Profile".

As claimed in another aspect of the invention, a filter device is designed to implement a method as claimed in any of the preceding claims.

In a development of the specified filter device, the specified device comprises a memory and a processor. In this case, the specified method is stored in the form of a computer program in the memory, and the processor is provided for the purpose of executing the method when the computer program is loaded from the memory into the processor.

As claimed in another aspect of the invention, a computer program comprises program code means in order to carry out all the steps of any of the specified methods when the computer program is executed on a computer or on any of the specified devices.

As claimed in another aspect of the invention, a computer program product contains a program code, which is stored on a machine-readable data storage medium and, when executed on a data processing device, performs any of the specified methods.

As claimed in another aspect of the invention, a receiver for a vehicle for the purpose of receiving messages packaged in data packets using a transmission signal in a vehicular ad hoc network comprises:

an antenna for receiving the transmission signal;
one of the specified filter devices for filtering at least some of the data packets from the transmission signal; and
a display device for extracting the messages from the filtered data packets.

In another aspect of the invention, a vehicle comprises one of the specified receivers.

A further aspect of the invention is described below and relates to a data selection method for reducing the quantity of data to be processed in a vehicle-to-X communication system.

Vehicle-to-X communication systems are already known in the prior art that are designed to transmit both traffic-related data and various service data such as entertainment applications, for instance. Said vehicle-to-X communication is based both on the exchange of data amongst vehicles (vehicle-to-vehicle communication) and on the exchange of data between vehicles and items of infrastructure (vehicle-to-infrastructure communication). The high level of reliability and data integrity required of information transmitted by vehicle-to-X communication necessitates providing such information with a complex security signature and/or data encryption.

The analysis of such a security signature or decoding such data encryption, however, is associated with a relatively high level of computing power. In order to minimize the computing power and hence the procurement costs of a computing module of sufficient computing power, various pre-processing methods are also known in the prior art which select from among all the received vehicle-to-X messages, the vehicle-to-X messages to be decoded. Often such pre-processing methods are based on the distance of the recipient from the sender of the vehicle-to-X messages by deducing from the distance a relevance of the vehicle-to-X message to the recipient.

Thus in vehicle-to-X communication, very different volumes of data must be processed as claimed in the situation, in particular depending on the number of communications nodes. This results in the need to provide hardware that must be designed for the extreme case, i.e. for the greatest level of computing demand to be expected, even though this computing power is often not needed. This extreme case is defined here by the maximum possible channel load, i.e. by that volume of data that can be transmitted as a maximum via the available communications channels. There is the added complication in determining the required computing power, however, that different data for the same volume requires processing steps of different complexity, for instance packet-forwarding or complete decoding.

Generally the approach in vehicle-to-X communication is to design a system that is as fully deterministic as possible in which each packet received by a recipient also results definitely in the desired response to this type of packet. Data losses are tolerated only at the physical level of communication. This results in extremely high levels of computing power, because all the data is processed at all levels of the communication stack right up to the final application. The term "packet" describes in the meaning of the invention a data packet that is contained in what is known as a vehicle-to-X message. The vehicle-to-X message is in turn transmitted by a sending communications node to a receiving communications node.

A further aspect of the invention is to reduce the computing power and in particular the decoding computing power of a vehicle-to-X communication system. The cost-intensive computing hardware of the vehicle-to-X communication system can hence also be designed to be simpler and less expensive.

The method of an aspect of the invention now intends to sacrifice complete processing of the received packets in favor of reduced computing power. The receive field strength is used as the criterion for selecting the packets to be processed and the packets that shall not be processed, i.e. shall be discarded.

A fixed threshold value for the receive field strength, however, is often not a satisfactory solution because over the long term the receiver hardware typically does not have reliable reproducibility as regards the number of packets to be processed and the number of packets to be discarded. Furthermore, a fixed threshold value would filter out an unnecessarily large number of packets in situations of low channel load.

In order nonetheless to be able to work with the receive field strength as the filter if possible in all situations, the following embodiments are particularly preferred:

1. If the number of received packets per unit of time rises above a specified value, the receiver sensitivity of the communications hardware is reduced, if applicable down to a minimum value specified in a vehicle-to-X communication standard. In the converse case, i.e. if more packets can be processed that are currently being received, the receiver sensitivity of the communications hardware is increased. This process can advantageously also be designed as a closed-loop control system, although any inertia in the communications hardware as regards adjusting the receiver sensitivity must be taken into account in the control system.

2. Instead of closed-loop or open-loop control of the receiver sensitivity of the communications hardware, it is also possible to use software to filter as claimed in the signal level or the receive field strength. Using software lends itself to first determining statistical quantities such as maximum value, minimum value, median and/or mean value of the signal level over a time period T1. Then over a time period T2 (which preferably is less than T1), the packets are sorted by signal level or are discarded when the level is below a threshold. In this case, the signal level can also be normalized, for example to (signal-level minimum value)/(maximum value−minimum value) or signal level/mean value or signal level/median, or it can be allocated to percentiles. The fundamental principle here is that larger signal levels mean that the sender is closer to the recipient and hence more relevant to the receiving vehicle or the receiving communications node. Normalization can be used to ensure that the receive situation is taken into account, so for instance different packets are discarded in open country than e.g. in town.

3. Both methods (hardware and software) for closed-loop or open-loop control of the receiver sensitivity and/or for filtering the signal level or the receive field strength can also be combined. In this case, owing to the inertia of the communications hardware as regards the adjustment of the receiver sensitivity, a first filtering is preferably performed by hardware, and a second, comparatively finer filtering ("fine filtering") is performed in software. Thus this means that the receive field strength is adjusted such that in the event of doubt, too many rather than too few packets are received. The software is then used to reduce the number of packets for subsequent processing to the required number.

The described methods are preferably also performed separately as claimed in receive sectors, i.e. as claimed in the receive direction of the packets. Receiver modules having a plurality of antennas and e.g. diversity are particularly suitable for this. The receive sectors preferably correspond to the directions "front", "behind", "left", "right". A better evaluation of situations such as junctions can be made by assessing the data packets separately as claimed in receive sectors. It can normally be assumed that signals from the front or behind have higher signal levels than signals from the left or right. Signals from the side, e.g. shortly before a collision at a junction, are often dangerous however. By processing in sectors, it is also advantageously possible for weighting to be formed as claimed in the probable driving maneuver of the vehicle. Signals from the left are more important, for instance, if the vehicle is turning to the left than when the vehicle is reversing.

Another preferred embodiment for assessing the packets as claimed in the receive direction is to weight the signal level as claimed in the radiation pattern of the antennas known from suitable measurements. In most cases, these measurements are already needed anyway for determining the receive direction. Hence differences in the signal level of a plurality of received packets, which differences arise solely from the radiation pattern of the antennas, can be factored out for subsequent processing and/or assessment.

The described method can hence guarantee with a high degree of probability that all the important packets are normally received. In particular this is also aided by the fact that important packets are generally sent more frequently than comparatively unimportant packets. Also owing to the changing underlying conditions between two packet-sending procedures from the same sender, it can be assumed statistically that the packets pass through the prefilter of the receiver early enough to be able to guarantee a prompt reaction.

As claimed in another preferred embodiment of the invention, it is provided that in an overload situation, i.e. a situation in which the number of packets actually to be processed exceeds the available computing capacity, the number of packets to be processed that come from the same sender is reduced by selectively omitting and hence discarding similar packets.

Preferably the method as claimed in the invention is deployed as early as possible in the processing chain for received packets, so for instance directly after the packets are physically received and still before the actual processing of the packets.

BRIEF DESCRIPTION OF THE DRAWINGS

The following description of the exemplary embodiments, which are explained in greater detail in association with the drawings, clarifies and explains the above-described properties, features and advantages of this invention and the way in which they are achieved, in which drawings:

FIGS. 8a and 8b are schematic diagrams of data packets that have been filtered from a signal received via the vehicular ad hoc network of FIG. 3.

DETAILED DESCRIPTION OF THE PREFERRED EMBODIMENTS

In the figures, technical elements that are identical are denoted by the same reference signs and described only once.

Figure 3:
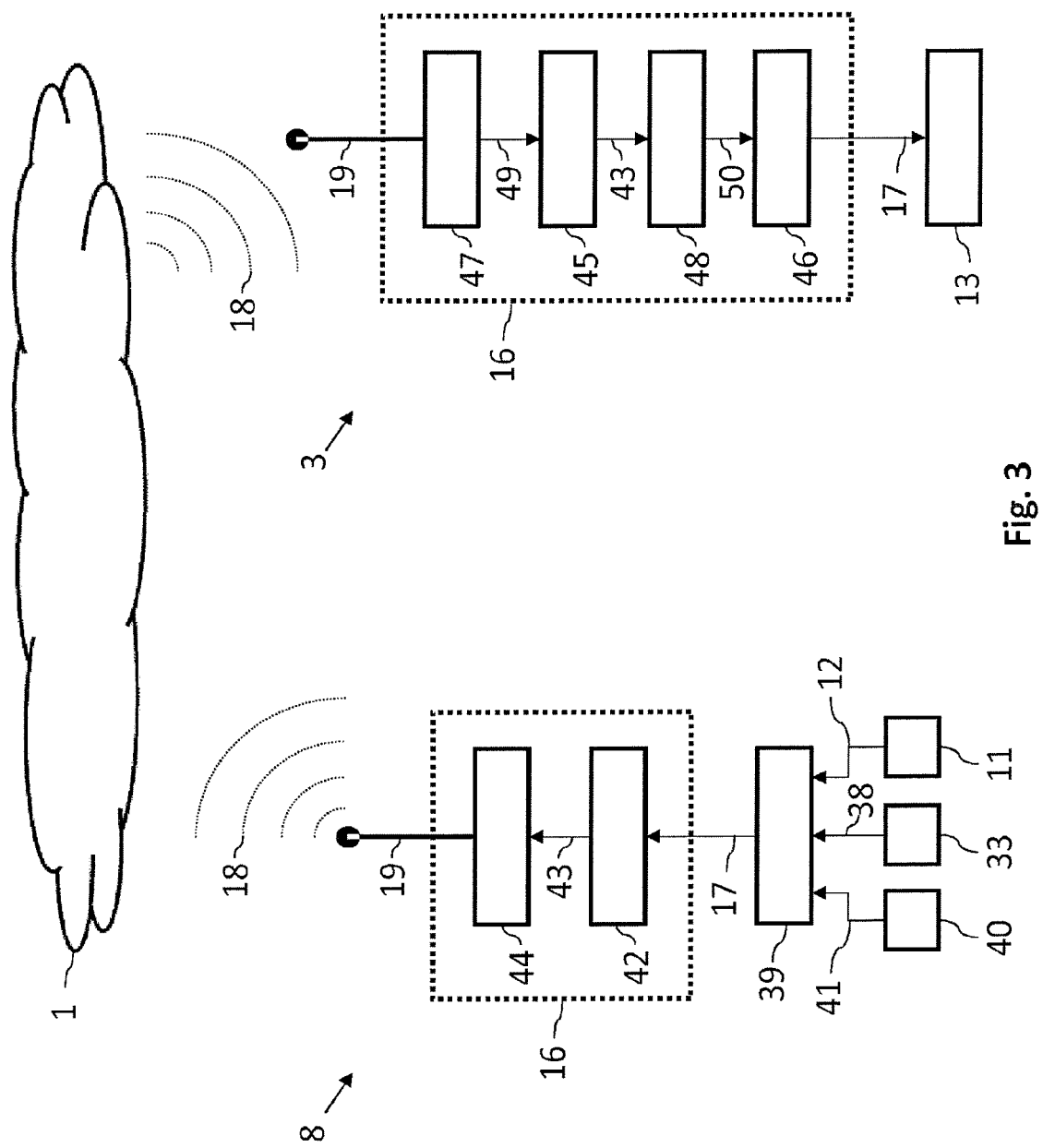
FIG. 3 is a schematic diagram of a vehicular ad hoc network in which the vehicle in FIGS. 1 and 2 can participate.

An aspect of the invention relates to a network protocol for a vehicular ad hoc network shown in FIG. 3 and referred to below as a car2X network 1 for the sake of simplicity. To give a better understanding of the technical background to this car2X network 1, an example application of this car2X network 1, which has no limiting effect, shall be given first before going into greater technical detail about this network.

Figure 1:
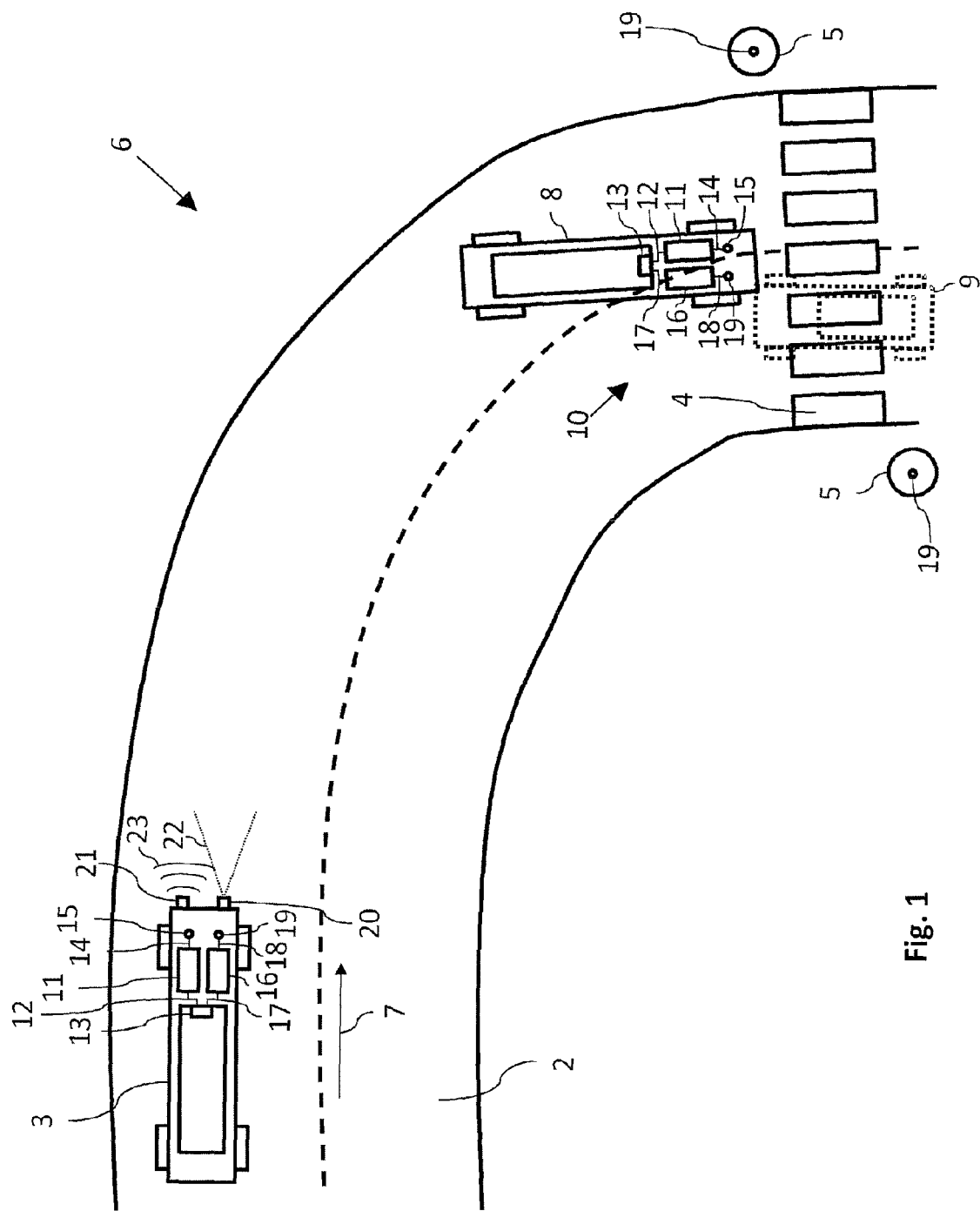
FIG. 1 is a schematic diagram of a vehicle travelling on a road.

Reference is therefore made to FIG. 1, which shows a schematic diagram of a vehicle 3 travelling on a road 2.

In the present embodiment, there is meant to be a pedestrian crossing 4 on the road 2, at which crossing a set of traffic lights 5 control whether the vehicle 3 or, if applicable, the vehicle 8 and/or 9 is allowed to cross over the pedestrian crossing 4 on the road 2, or whether a pedestrian (not described further) can cross over the road 2 on the pedestrian crossing 4. In the present embodiment, there is located between the pedestrian crossing 4 and the traffic lights 5 an obstacle in the form of a curve 6, which conceals the pedestrian crossing 4 from the driver of the vehicle 3 and from surround sensors (still to be described) of the vehicle 3.

FIG. 1 shows in a travel direction 7 in front of the vehicle 3, a further vehicle 8, which is involved in a traffic accident 10 with a vehicle 9 (shown dotted) on the pedestrian crossing 4 and is blocking the traffic lane in the travel direction 7 of the vehicle 3.

The pedestrian crossing 4 and the traffic accident 10 constitute hazardous situations on the road 2. If the driver of the vehicle 3 fails to notice the pedestrian crossing 4 and thus, against the rules, does not stop in front of this crossing, the driver might hit a pedestrian who is crossing the pedestrian crossing 4 and in crossing the pedestrian crossing 4 is trusting that the driver of the vehicle 3 will behave as claimed in the rules. In both hazardous situations, the driver of the vehicle 3 must stop the vehicle 3 to avoid a collision with the hazard in the hazardous situation, i.e. with the pedestrian and/or the additional vehicle 8. The car2X network 1 can be used for this purpose, about which further details will be given later.

In the present embodiment, the vehicle 3 comprises a receiver 11 for a global satellite navigation system, referred to below as a GNSS receiver 11, by means of which the vehicle 3 can determine in a manner known per se position data in the form of the absolute geographical position 12 of said vehicle, and can use said position data, for example, in a navigation system 13 in order to display said position data in a geographical map (not described further). Suitable signals 14 from the global satellite navigation system, which signals are referred to below as GNSS signals 14, can be received via a suitable GNSS antenna 15, for example, and routed to the GNSS receiver 11 in a manner known per se.

In the present embodiment, the vehicle also comprises a transceiver 16, via which the vehicle 3 can participate as a node in the car2X network 1 and can exchange messages, referred to below as car2X messages 17, with other nodes, for instance nodes such as the additional vehicle 8 and/or the traffic lights 5. To distinguish this transceiver 16 from the GNSS receiver 11, it shall be referred to below as a car2X transceiver 16.

In the car2X messages 17 exchanged via the car2X network 1, the individual nodes 3, 5, 8 can exchange amongst one another data specifying various information, which data can be used, for example, to increase the road safety on the road 2. One example of the information that can be exchanged using the data in the car2X messages 17 would be the absolute geographical position 12 of the particular node 3, 5, 8 of the car2X network 1, which position is determined using the GNSS receiver 11. Such data can also be referred to as position data. If the node 3, 5, 8 belonging to the car2X network 1 and receiving the geographical position 12 is a vehicle, such as, for instance, the vehicle 3 that is not involved in the traffic accident 10 and the vehicle 8 involved in the traffic accident 10, then the geographical position 12 received via the car2X network 1 can be used to display the traffic movement, for example, on the navigation system 13, for instance, of the receiving vehicle 3, 8. If the data in the car2X message 17 is used to specify in addition to the absolute geographical position 12 also the traffic accident 10 as information, then certain traffic situations, such as the traffic accident 10, for example, can be displayed more precisely on the navigation system 13. Further details of possible information that may be exchanged using the car2X messages 17 are given later in the context of FIG. 2.

Figure 2:
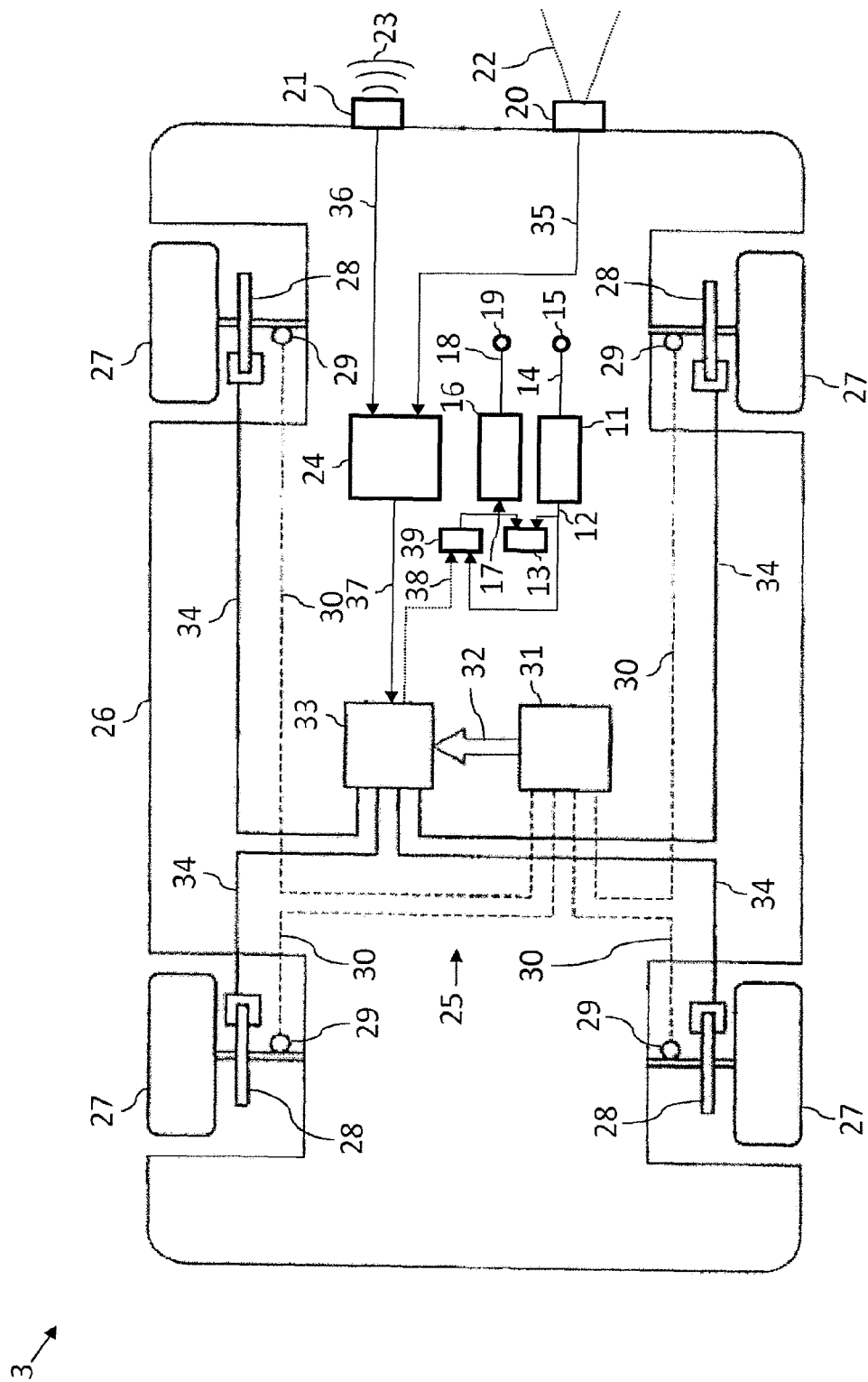
FIG. 2 is a schematic diagram of the vehicle in FIG. 1.

In order to exchange the car2X messages 17, the car2X transceiver 16 either modulates a car2X message 17 onto a transmission signal, referred to below as a car2X signal 18, and sends said signal via an antenna, referred to below as a car2X antenna 19, to the other nodes 3, 5, 8 in the car2X network 1, or receives via the car2X antenna 19 a car2X signal 18, and filters the relevant car2X message 17 out of this signal. This is discussed in greater detail at a later point in the context of FIG. 3. FIG. 1 shows the case in which the car2X transceiver 16 outputs a car2X message 17 to the navigation system 13 under the assumption that this message contains information in the manner described above that can be displayed on said system. This shall not be understood to have a limiting effect, however. In particular, the GNSS receiver 11 can advantageously also be connected to the car2X transceiver 16 directly or, as shown in FIG. 2, indirectly in order to send its own absolute geographical position 12 in the car2X network 1.

The structure of the car2X message 17 and of the car2X signal 18 and hence the design of the car2X network can be defined in a communication protocol. Such communication protocols already exist and vary as claimed in country, and include protocols in the ETSI TC ITS framework under ETSI in Europe and in the IEEE 1609 framework for the IEEE and the SAE in the USA. Further details on these protocols can be found in the stated specifications.

The vehicle 3 can optionally also comprise the above-mentioned surround sensors in the form of a camera 20 and a radar sensor 21. The vehicle 3 can use the camera 20 to acquire within an angle of view 22 an image of a view that lies in front of the vehicle 3 viewed in the travel direction 7 of the vehicle 3. In addition, the vehicle 3 can use the radar sensor 21 and suitable radar beams 23 to detect objects viewed in the travel direction 7 of the vehicle 3 and determine the distance from the vehicle 3 in a manner known per se.

To provide more specific details about the information that can be transmitted using a car2X message 17, the design of the vehicle 3 and of the additional vehicle 8 shall first be discussed below by way of example with reference to the vehicle 3. The vehicle 3 possesses various safety components, of which FIG. 2 shows an electronic brake assist system 24, referred to as an EBA 24, and an electronic stability control system 25 known per se. DE 10 2004 030 994 A1, which is incorporated by reference, contains details of the EBA 24, while DE 10 2011 080 789 A1, which is incorporated by reference, provides details of the electronic stability control system 25.

The vehicle 3 comprises a chassis 26 and four wheels 27. Each wheel 27 can be decelerated with respect to the chassis 26 using a brake 28, which is fixed to the chassis 26, in order to reduce the speed of a movement of the vehicle 3 on the road 2.

In a way that is known to a person skilled in the art, it can happen here that the wheels 27 of the vehicle 3 lose traction and the vehicle 3 actually moves away from a trajectory set, for instance, by a steering wheel (not described further) by oversteering or understeering. This is prevented by the electronic stability control system 25.

In the present embodiment, the vehicle 4 comprises for this purpose speed sensors 29 on the wheels 27, which detect a rotational speed 30 of the wheels 27.

On the basis of the detected rotational speeds 30, a controller 31 can identify in a manner known to a person skilled in the art whether the vehicle 3 is skidding on the road surface or is actually deviating from the above-mentioned set trajectory, and can respond thereto accordingly using a controller output signal 32 known per se. The controller output signal 32 can then be used by a control unit 33 in order to actuate by means of control signals 34 final control elements, such as the brakes 28, which react in a manner known per se to the skidding and the deviation from the set trajectory.

The EBA 24 can analyze the image data 35 acquired by the camera 20 and the distance data 36 from objects such as vehicles in front of the vehicle 3 in the travel direction 7, which distance data is acquired by the radar sensor 21, and recognize a hazardous situation on the basis thereof. This situation might exist, for instance, if an object in front of the vehicle 3 is approaching said vehicle at too high a speed. In such a case, the EBA 24 could use an emergency brake signal 37 to instruct the control unit 33 by means of the control signals 34 to perform emergency braking using the brakes 28.

Every time that the EBA 24 or the electronic stability control system 25 intervenes via the control unit 33 in the vehicle 4, the control unit 33, for instance, can output a report signal 38, shown dotted in FIG. 2. The report signal 38 should advantageously specify whether the intervention was caused by the EBA 24 or the electronic stability control system 25. Such a report signal 38 can be generated by any entity in the vehicle 3, so for instance even by the controller 31 of the electronic stability control system 25. A message generator 39 could then generate a car2X message 17 on the basis of the report signal 38, the absolute geographical position 12 and a timestamp 41 shown in FIG. 3 and output from a timer 40, which message can be used to report the intervention of the EBA 24 and/or of the electronic stability control system 25 as information to the other nodes 5, 8 via the car2X network 1. The car2X message 17 generated in this way could then be sent in the car2X network 1 by means of the car2X antenna 19.

In the example of FIG. 1, it has been explained that the information exchanged in the car2X messages 17 about the absolute geographical position 12 of the individual nodes 3, 5, 8 and/or about events such as the traffic accident 10 and/or such as intervention of the EBA 24 and/or of the electronic stability control system 25 could be displayed on the navigation system 13 for the purpose of driver guidance. Alternatively or additionally, however, the information exchanged in the car2X messages 17 can also form the basis for actively generating control signals 34, for example by the control unit 33. If, for example, the intervention of the EBA 24 is communicated as information in a car2X message 17, then for instance on the basis of receiving this car2X message 17, the EBA 24 could be actuated automatically in the receiving vehicle 3, 8.

The transmission of a car2X message 17 via the car2X network 1 shall be explained below with reference to FIG. 3, with a cloud being used in FIG. 3 to indicate said car2X network for the sake of clarity. It shall be assumed by way of example that the car2X message 17 contains an intervention by the EBA 24 in the accident vehicle 8 involved in the traffic accident 10, which intervention is reported by the control unit 33 using the report signal 38.

As already explained, the message generator 39 generates the car2X message 17 on the basis of the report signal 38, the absolute geographical position 12 and the timestamp 41 in accordance with the above-mentioned communication protocol. In principle, said message generator 39 can also be part of the car2X transceiver 16.

In the car2X transceiver 16 of the accident vehicle 8, data packets 43 are generated in a data-packet generator 42 from the car2X message 17. By generating data packets 43, it is possible to assemble car2X messages 17 from different applications in the accident vehicle 8 into one single data stream in order to generate the car2X signal 18. The data-packet generator 42 therefore corresponds to a network and transport layer, which has the known function of routing the network data from different applications. The design of the data-packet generator 42 depends on the above-mentioned specification of the communication protocol for the car2X network 1.

The generated data packets 43 are modulated onto the car2X signal 18 in a modulator 44, and sent wirelessly in the car2X network 1. The modulator 44 therefore corresponds to an interface layer, which has the function of providing the physical interface between the accident vehicle 8 and the car2X network 1. The design of the modulator 44 also depends on the above-mentioned specification of the communication protocol for the car2X network 1.

The car2X signal 18 sent by the accident vehicle 8 can then be received by the vehicle 3 that is not involved in the traffic accident 10 via the car2X antenna 19.

In order to extract the car2X message 17 from the car2X signal 18, the car2X transceiver 16 of the vehicle 3 has a demodulator 45, which reverses in a manner known per se the modulation of the data packets 43 performed by the sender. A message extractor 46 can accordingly extract the car2X messages 17 from the data packets 43 and provide said messages to the applications in the vehicle 3, for instance to the navigation system 13 or even to the control unit 33. Ultimately, the demodulator 45 and the message extractor 46 constitute the receive-end counterparts corresponding to the above-mentioned network and transport layer and the interface layer, and likewise depend on the above-mentioned specification of the communication protocol for the car2X network 1.

Reference is therefore made to the relevant specifications for details of the individual network layers.

Especially in high-load situations when a large number of nodes 3, 5, 8 in the car2X network 1 are present on the road 2, correspondingly high levels of computing resources must be kept available in the respective nodes 3, 5, 8 for processing all the car2X messages 17 sent in the car2X network 1 in order to guarantee that all the car2X messages 17 are processed at the receiver end within specific time limits. Providing these high levels of computing resources is associated with correspondingly high costs, which the present invention aims to reduce by introducing the prefilters 47, 48.

The idea behind the prefilters 47, 48 is to sort out potentially irrelevant car2X messages 17 as early as possible in order to avoid an element in the receive chain having to process said messages unnecessarily, because they contain information that is anyway irrelevant to the receive node. Whereas the first prefilter 47 is here meant to filter the car2X signal 18 without any knowledge of the actual car2X message 17, the second prefilter 48 is meant to filter the data packets 43 without any knowledge of the actual car2X message 17. Although this no longer guarantees that of the car2X messages 17 sent in the vehicular ad hoc network 1, also all the safety-critical car2X messages 17 such as, for instance, a message about an intervention by the EBA 24, actually also arrive at the vehicle 3, usually such safety-critical car2X messages 17 are not sent just once, and therefore it can be assumed as a statistical average that such safety-critical car2X messages 17 pass through the prefilters 47, 48 in a reasonable timeframe. In order to keep this reasonable timeframe as short as possible, prefilters 47, 48 can be designed such that safety-critical data passes through the prefilters 47, 48 with an above-average probability.

For pre-filtering in the prefilters 47, 48 to be as efficient as possible, a predetermined condition is introduced, which is used as the basis for prefiltering the car2X signal 18 in the first prefilter 47 and/or the data packets 43 in the second prefilter 48. This predetermined condition is explained below with reference to FIGS. 4 and 5, which show an example of the car2X signal 18 and a signal 51 carrying the data packets 43 belonging to the car2X signal 18, in each case as a diagram of signal strength 52 against time 53.

The car2X signal 18 can be any carrier signal onto which the data packets 43 are modulated in a desired manner. Since the car2X signal 18 transmits the data packets 43 from all the nodes 3, 5, 8 participating in the car2X network 1, there are, in addition to the data packets 43 from the accident vehicle 8, also data packets 43 from nodes 3, 5, 8 that are further away from the vehicle 3, such as for instance one of the two traffic lights 5. As is apparent from FIG. 4, such a node 5 that is further away can be recognized by the fact that the data packets 43 from said node are transmitted at a signal strength 52 that is considerably less than the signal strength 52 of the data packets 43 from the accident vehicle 8. The prefiltering can be put into action at this point and used to filter out from the car2X signal 18 only the data packets 43 having a signal strength 52 that exceeds a certain minimum signal strength 54. For this purpose, the first prefilter 47 can prefilter, for example, the car2X signal 18 such that the prefiltered car2X signal 49 and thus the data packets 43 from the corresponding node 8 are filtered out.

Figure 5:
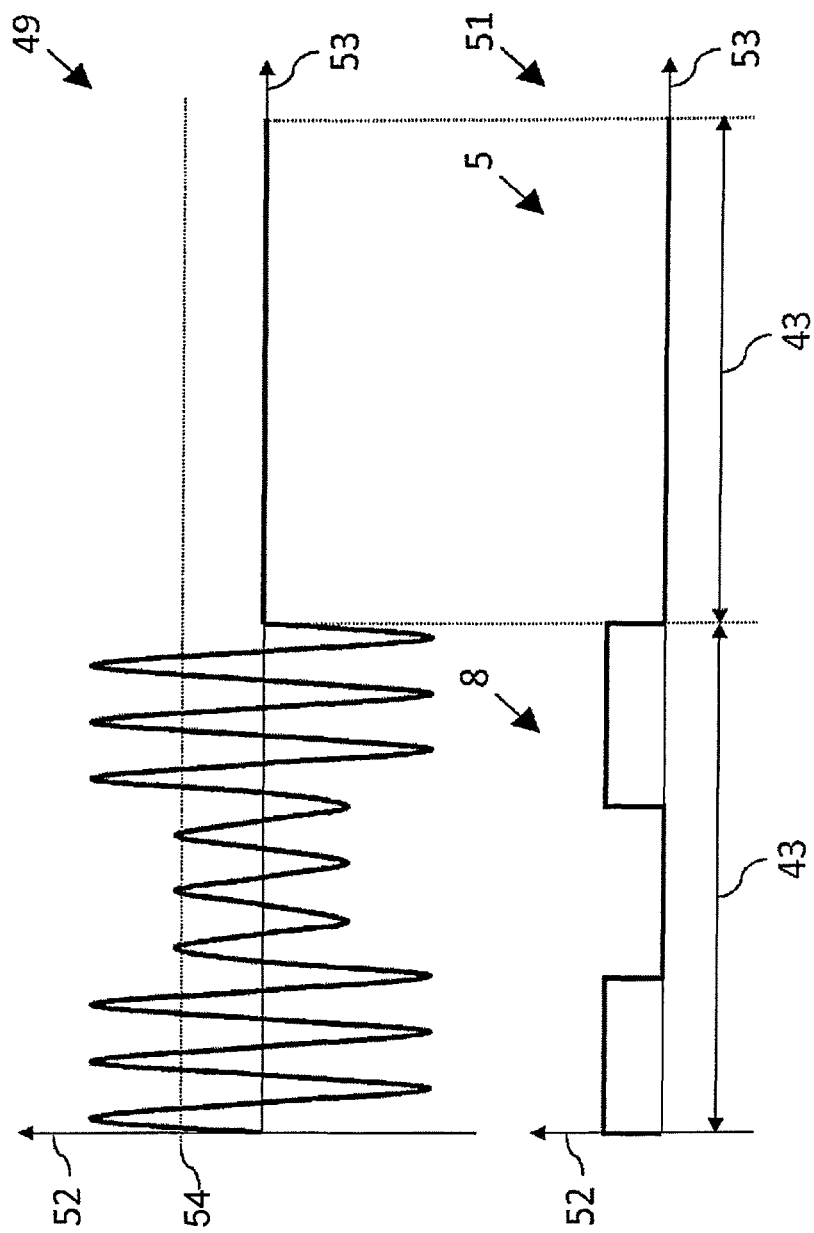
FIG. 5 is a schematic diagram of filtered signals that have been received from the vehicular ad hoc network of FIG. 3.
Figure 6:
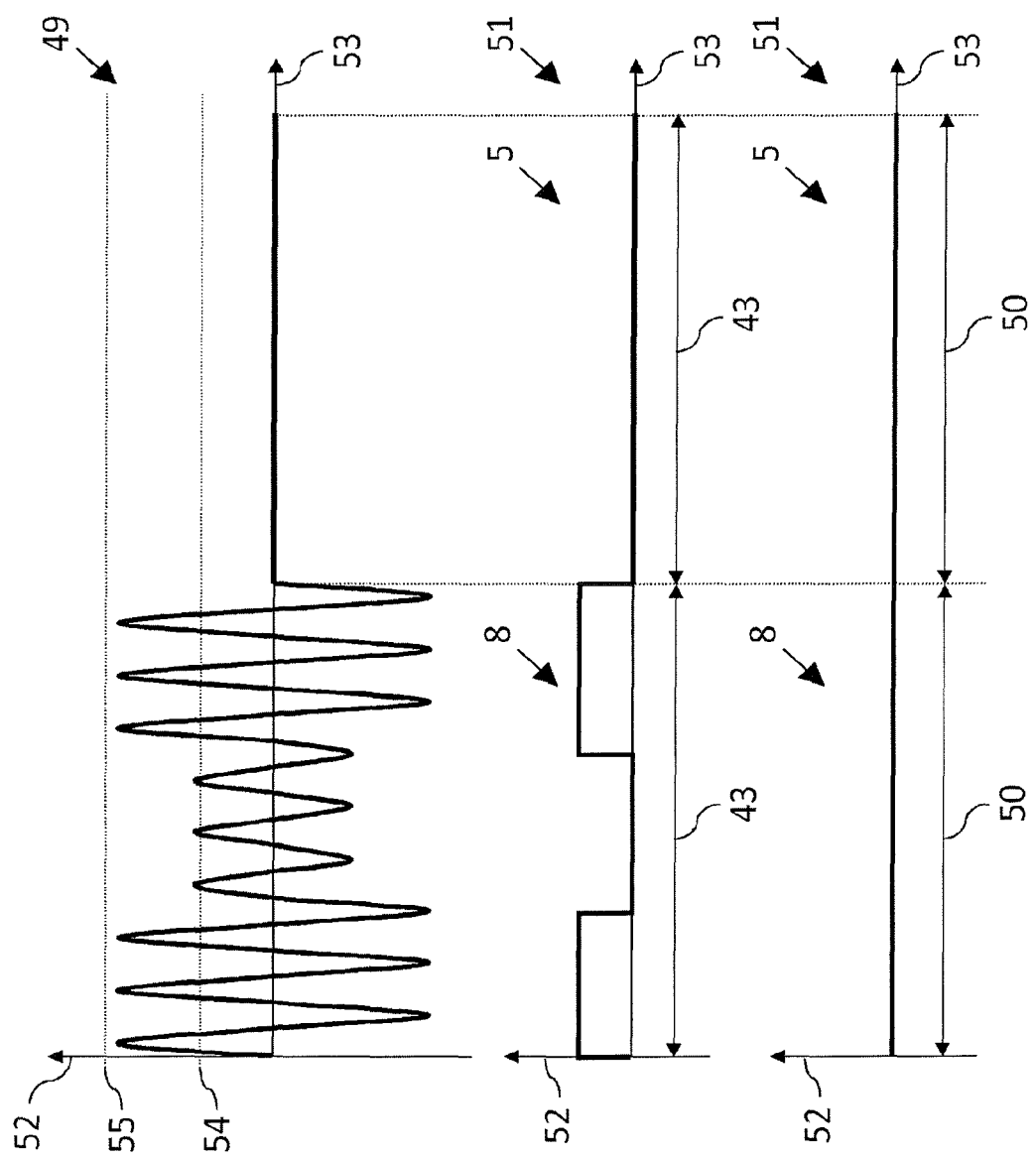
FIG. 6 is a schematic diagram of alternative filtered signals that have been received from the vehicular ad hoc network of FIG. 3.

In the second prefilter 48, the prefiltered car2X signal 49 could then be re-filtered again, as shown in FIG. 6, on the basis of an additional minimum signal strength 55, which prefilter would then have to know the signal strength 52 of the car2X signal 18 for each data packet 43. The minimum signal strength 54 in FIGS. 4 and 5 could be selected here such that the number of data packets 43 resulting from the filtered car2X signal 49 is always higher than the available computing power. Only using the additional minimum signal strength 55 in the second prefilter 48 would it be possible to reduce the number of the thus filtered data packets 50 such that the computing power required is adjusted to the available computing power. The data packets 43 of the accident vehicle 8 could then also be filtered out in this case if, for instance, said vehicle is still too far away from the vehicle 3. The minimum signal strength 54 should advantageously be selected to be less than the additional minimum signal strength 55, because otherwise the second prefilter 48 would have no effect.

Filtering the car2X signal 18 and/or the data packets 43 on the basis of the minimum signal strengths 54, 55 has the effect that nodes 5, 8 in car2X network 1 that are too far away to be safety-critical for the vehicle 3 remain disregarded when there is too high a computing load for the aforementioned data processing unit to process all the data packets 43 arriving in the car2X signal 18, because in this case there are certainly nodes 5, 8 in the car2X network 1 located closer to the vehicle 3 and/or events 10 that are more important from road safety aspects, because otherwise the high computing load would not arise. Expressed graphically, the minimum signal strengths 54, 55 are being used to try to set receive radii around the vehicle 3 when the computing load is too high, outside of which radii the data packets 43 from the nodes 5, 8 of the car2X network 1 are ignored. It is then no longer relevant what content has actually been sent by these nodes 5, 8.

The minimum signal strengths 54, 55 and hence the receive radii should not be set statically, however, because then in the event of sufficient signal processing resources for processing data packets 43 in the car2X signal 18, data packets 43 are ignored or sorted out unnecessarily.

Figure 7B:
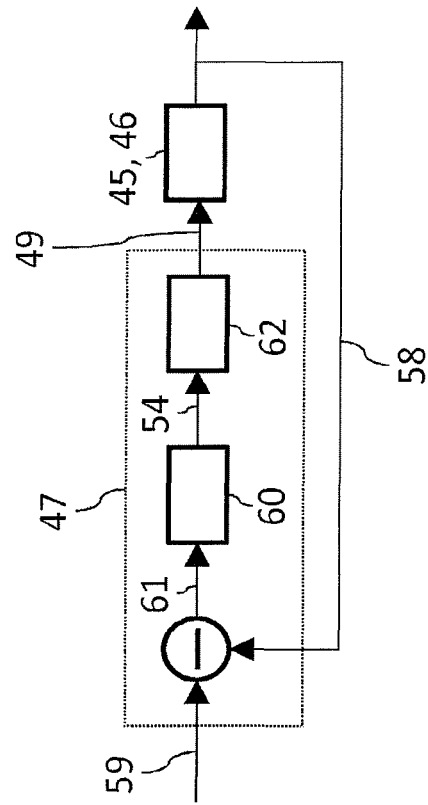
FIGS. 7a and 7b are schematic diagrams of a receive filter for filtering the signal shown in FIG. 4.
Figure 7A:
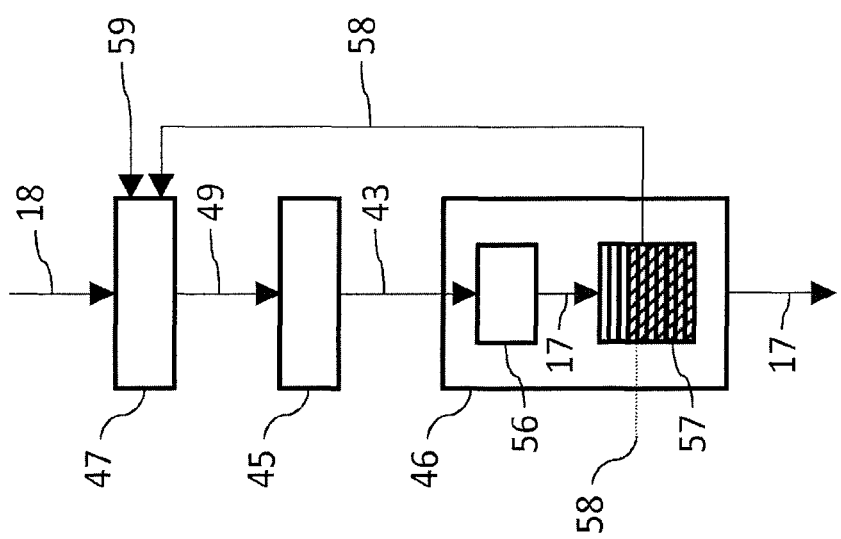

Thus the minimum signal strengths 54, 55 should be selected in a variable manner, which could be performed, for instance, in the first prefilter 47 on the basis of a closed-loop control system, which is shown in FIGS. 7a and 7b. For this purpose and solely for the sake of clarity, and with no limiting effect on the invention, the second prefilter 48 shall be dispensed with. In practice, the second prefilter 48 can obviously be present.

Figure 4:
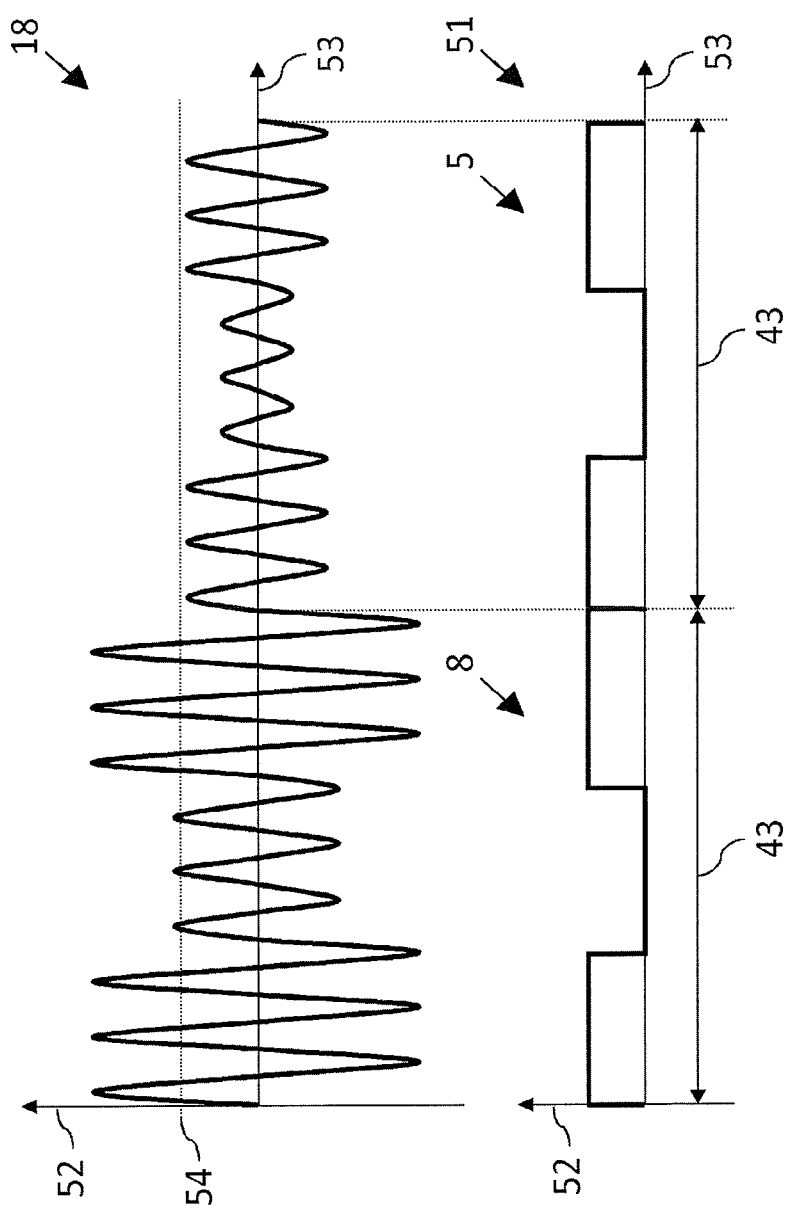
FIG. 4 is a schematic diagram of signals transmitted in the vehicular ad hoc network of FIG. 3.

If the car2X messages 17 are extracted from the data packets 43 of the filtered car2X signal 49 in the message extractor 46 by means of a suitable signal processing unit 56, these messages can be stored in a queue 57 if they cannot be processed immediately by the higher-level signal processing units, for instance units such as the navigation system 13 and/or the control unit 33. The actual level 58 of the queue 57 can be used here as an indicator of whether or not the total computing power is sufficient. If the actual level 58 exceeds a specified setpoint level 59, at and above which the computing power of the entire system is no longer sufficient to process all the data packets 43, the minimum signal strength 54 in the first prefilter 47 can be raised accordingly by a controller 60 on the basis of a controller error 61 between the setpoint level 59 and the actual level 58, in order to reduce the number of data packets 71 arriving at the message extractor 46 using a suitable filter element 62 that is dependent on the minimum signal strength 54, as shown in FIGS. 4 and 5.

As an alternative or in addition to the first prefilter 47, the second prefilter 48 can now perform filtering in accordance with FIGS. 8a and 8b:

First, normalization can be performed in a period under consideration 63 for a number of data packets, which are labelled by the reference signs 43.1 to 43.7 in FIGS. 8a and 8b. For this purpose, the signal strength 52 of each data packet 43.1 to 43.7 can be normalized as claimed in any normalization rule, such as for instance:

$$A_{norm}(A)=(A-A_{min})/(A_{max}-A_{min}),$$

where A represents the signal strength 52, $A_{norm}$ the normalized signal strength 64, $A_{min}$ the minimum signal strength 65 in the period under consideration 63 and $A_{max}$ the maximum signal strength 66 in the period under consideration 63. An alternative normalization rule would be, for instance:

$$A_{norm}(A)=A/(A_{max}-A_{min}).$$

The data packets 43.1 to 43.7 normalized in their signal strength 52 in this manner can then be sorted as shown in FIG. 8b, or, in the event that the signal strength is below the additional minimum signal strength 65 for the second prefilter 48, sorted out.

Using normalization can ensure that data packets 43 are handled in a standardized manner in different receive scenarios, for instance in town or in open country.

There can be further prefilters, which are not shown, in addition to the prefilters 47, 48. One option would be to define receive sectors on the vehicle 3, and for the car2X antenna 19 to have a directional design. Then one car2X antenna 19 could be directed into each of these defined receive sectors, whereby the receive direction of the car2X signal 18 and/or of the data packets 43 could be ascertained. It is not essential here to provide a dedicated transceiver 16 for each directional car2X antenna 19. The receive sectors could be defined, for example, in front of the vehicle 3, behind the vehicle 3, to the left of the vehicle 3 and to the right of the vehicle 3, viewed from the travel direction 7 of the vehicle 3. A better evaluation of situations such as junctions in the road 2 can be made on the basis of the assessment of the data packets 43 as claimed in these receive sectors. It can normally be assumed that car2X signals 18 which, viewed in the travel direction 7, are received from in front of or from behind the vehicle 3 have higher signal levels 52 than car2X signals 18 that are received from the left or from the right of the vehicle 3. This could then be taken into account in determining the normalized signal level 64, because car2X signals 18 transmitting data packets 43 and coming from the receive sectors to the left and right of the vehicle 3, e.g. shortly before a collision at a junction in the road 2, are often dangerous. The normalization of the signal level 52 to the normalized signal level 64 can take into account, for example, also the probable driving maneuver of the vehicle 3, because car2X signals 18 coming from the left are more important if the vehicle is turning to the left, for instance, than when the vehicle 3 is reversing. Alternatively, however, the receive sectors could also be taken into account in a weighting process rather than in a normalization process.

In the assessment of the received data packets 43 as claimed in the receive direction, the normalization or weighting of the signal level 52 could likewise take into account the radiation pattern of the relevant car2X antenna 19 for the particular receive direction. This radiation pattern could be measured, for example, and is already needed anyway in most cases for determining the receive direction. Hence differences in the signal level 52 of a plurality of received data packets 43, which differences arise solely from the radiation pattern of the car2X antenna 19, can be factored out for subsequent processing and/or assessment.

In addition, it would also be possible in situations in which the number of data packets 43 that are actually to be processed exceeds the available computing capacity, to reduce the number of data packets 43 to be processed that come from the same sender, so for instance from the accident vehicle 8, by selectively omitting and hence discarding similar data packets 43 indicating, for instance, the accident 10.

The filtering processes should be deployed as early as possible in the processing chain for received data packets, so for instance directly after the car2X signal 18 is physically received and still before the actual processing of the data packets 43 contained therein.

Figure 9A:
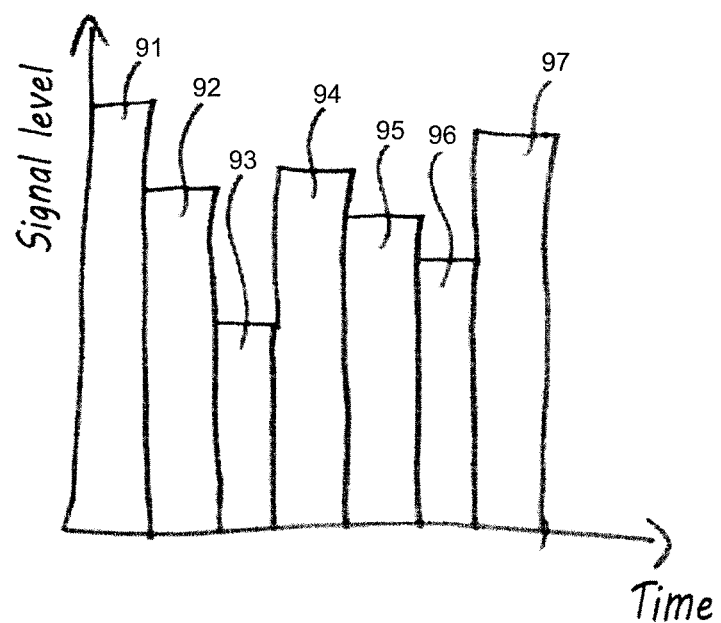
FIGS. 9a and 9b show signal levels of a number of received packets.
Figure 9B:
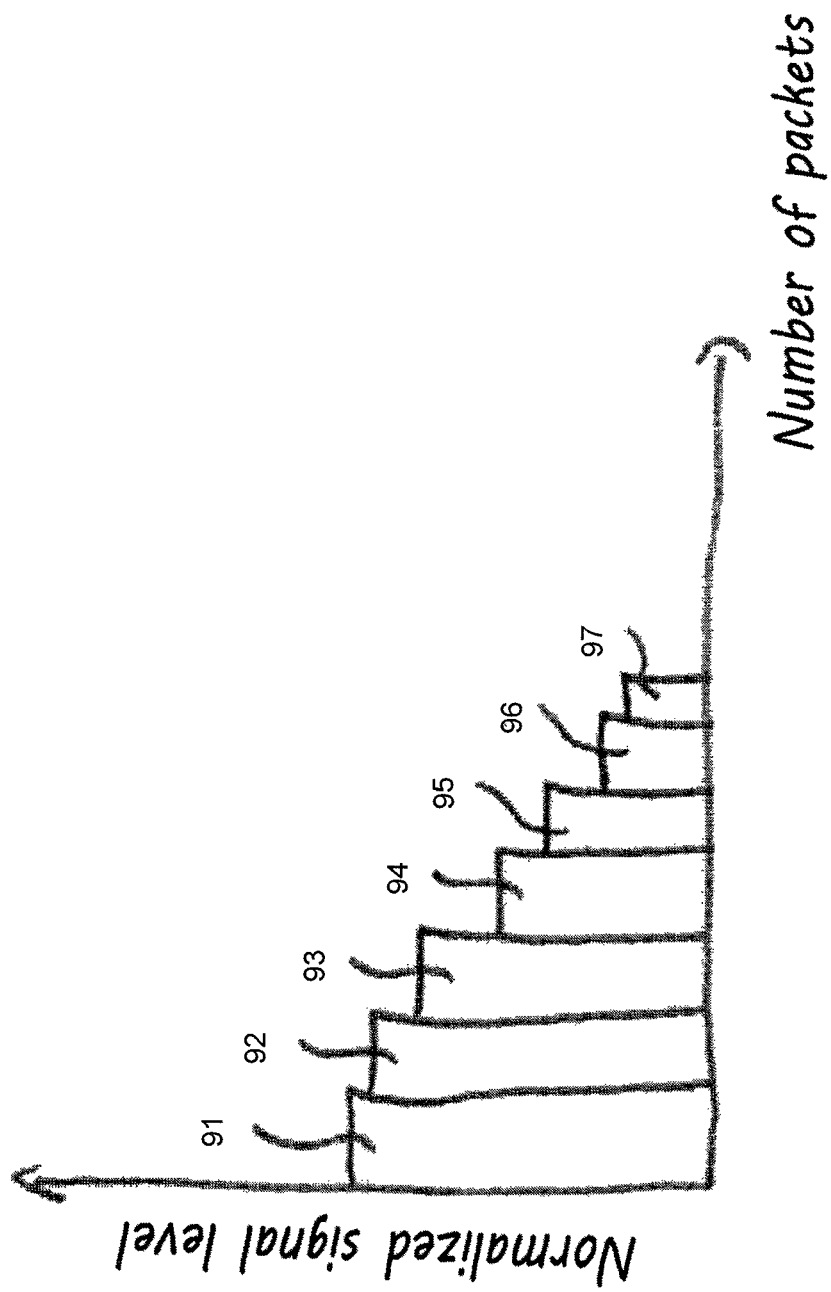

The reference signs in FIGS. 9*a* and 9*b* describe different technical elements from the reference signs in FIGS. 1 to 8.

FIG. 9*a* shows the signal levels (y-axis) of a number of received packets 91, 92, 93, 94, 95, 96 and 97 which have been received in the time period T1 (x-axis). The signal levels of packets 91, 92, 93, 94, 95, 96 and 97 in this case lie above a set and variable sensitivity threshold of the receiver hardware used in the vehicle-to-X communication system. If the number of packets 91, 92, 93, 94, 95, 96 and 97 is so great that decoding or evaluation would not be possible in a reasonable time, received packets 91, 92, 93, 94, 95, 96 and 97 are normalized in FIG. 9*b* with respect to the mean value of the signal level and then sorted as claimed in their signal level. The signal levels sorted and normalized in this manner are shown in FIG. 9*b*. The signal levels of packets 91, 97, 94 and 95 lie above threshold value 98, whereas the signal levels of packets 96 and 93 lie below threshold value 98. Therefore packets 96 and 93 are discarded. Hence the number of packets to be processed has been reduced to a manageable size commensurate with the computing power available. The further aspect of the invention can also be described by the following paragraphs:

1. A data selection method for reducing the quantity of data to be processed in a vehicle-to-X communication system, wherein a communications unit is used to receive and send vehicle-to-X messages, and wherein the received vehicle-to-X messages contain the data to be processed, characterized in that
the data to be processed is selected as claimed in a receive field strength of the vehicle-to-X message containing the data.
2. The method as claimed in paragraph 1, characterized in that
the data from all the received vehicle-to-X messages is processed.
3. The method as claimed in at least one of paragraphs 1 and 2, characterized in that
a receiver sensitivity of the communications unit can be adjusted and/or regulated.
4. The method as claimed in at least one of paragraphs 1 to 3, characterized in that
the receiver sensitivity of the communications unit can be regulated and/or adjusted such that a computing power needed to process a volume of the data to be processed does not exceed an available computing power.
5. The method as claimed in at least one of paragraphs 1 to 4, characterized in that
the data which is contained in vehicle-to-X messages that have a receive field strength greater than a defined threshold are processed.
6. The method as claimed in at least one of paragraphs 1 to 5, characterized in that
the data which is contained in vehicle-to-X messages that have a receive field strength less than a defined threshold are discarded.
7. The method as claimed in at least one of paragraphs 1 to 6, characterized in that
the threshold can be adapted to the volume of data to be processed.
8. The method as claimed in at least one of paragraphs 1 to 7, characterized in that
the threshold is reduced if the necessary computing power is less than the available computing power.
9. The method as claimed in at least one of paragraphs 1 to 8, characterized in that
the threshold is increased if the available computing power is less than the necessary computing power.
10. The method as claimed in at least one of paragraphs 1 to 9, characterized in that
the threshold can be regulated and/or adjusted.
11. The method as claimed in at least one of paragraphs 1 to 10, characterized in that
the receive field strengths are normalized.
12. The method as claimed in paragraph 11, characterized in that
the receive field strengths are weighted differently in a normalization for different receive directions.
13. The method as claimed in at least one of paragraphs 1 to 12, characterized in that
the vehicle-to-X messages are sorted as claimed in their receive field strengths.
14. The method as claimed in paragraph 13, characterized in that
a weighting in the normalization depends on an intended driving manoeuver of the vehicle.
15. The method as claimed in at least one of paragraphs 1 to 14, characterized in that
the normalization takes into account a radiation pattern of the communications unit.

The invention claimed is:
1. A method for filtering a transmission signal transmitted in a vehicular ad hoc network, which signal carries in data packets at least position data about participants, the method comprising:

receiving a transmission signal;

filtering the data packets from the transmission signal on the basis of a receive filter that has a predetermined receive filter specification for demodulating the data packets from the transmission signal and an additional predetermined condition; and outputting the filtered data packets to a data processing unit at a higher level than the receive filter, wherein the predetermined condition comprises a minimum signal strength that the transmission signal must possess at the position of a specific data packet, and wherein the minimum signal strength is dependent on a processing load of the receive filter and/or of the data processing unit.

2. The method as claimed in claim 1, wherein the minimum signal strength depends on at least one normalized value for the transmission signal in a predetermined time window.

3. The method as claimed in claim 2, wherein the minimum signal strength is selected such that in the predetermined time window, a number of data packets that are transmitted by the transmission signal in the time window with the highest signal strengths are selected from the transmission signal.

4. The method as claimed in claim 2, wherein the data packets are filtered first on the basis of the minimum signal strength, which is dependent on the processing load, and then on the basis of an additional minimum signal strength, which is referred to the normalized value.

5. The method as claimed in claim 4, wherein the additional minimum signal strength is greater than the minimum signal strength.

6. The method as claimed in claim 2, wherein the data packets are filtered first on the basis of the minimum signal strength, which is dependent on the processing load, and then on the basis of an additional minimum signal strength, which is referred to the normalized value.

7. The method as claimed in claim 1, wherein the value of the minimum signal strength has an absolute maximum.

8. A filter device for implementing a method as claimed in claim 1.

9. The method as claimed in claim 1, wherein the minimum signal strength depends on at least one normalized value for the transmission signal in a predetermined time window.

10. A receiver for a vehicle for the purpose of receiving messages packaged in data packets using a transmission signal in a vehicular ad hoc network comprises:

an antenna for receiving the transmission signal;

a filter device filtering the data packets from the transmission signal on the basis of a predetermined filter specification for demodulating the data packets from the transmission signal and an additional predetermined condition, and outputting the filtered data packets to a data processing unit at a higher level than the filter device, wherein the predetermined condition comprises a minimum signal strength that the transmission signal must possess at the position of a specific data packet, and wherein the minimum signal strength is dependent on a processing load of the receive filter and/or of the data processing unit; and a display device for extracting the messages from the filtered data packets.

* * * * *